(12) United States Patent
Chae

(10) Patent No.: US 9,751,520 B2
(45) Date of Patent: Sep. 5, 2017

(54) APPARATUS AND METHOD FOR CONTROLLING TRAVEL OF VEHICLE

(71) Applicant: HANWHA TECHWIN CO., LTD., Changwon-Si (KR)

(72) Inventor: Hee Seo Chae, Changwon-si (KR)

(73) Assignee: HANWHA LAND SYSTEMS CO., LTD., Changwon-si (KR)

( * ) Notice: Subject to any disclaimer, the term of this patent is extended or adjusted under 35 U.S.C. 154(b) by 311 days.

(21) Appl. No.: 14/332,538

(22) Filed: Jul. 16, 2014

(65) Prior Publication Data

US 2015/0183419 A1 Jul. 2, 2015

(30) Foreign Application Priority Data

Dec. 26, 2013 (KR) .................. 10-2013-0164129

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60W 20/00* | (2016.01) | |
| *B60W 10/20* | (2006.01) | |

(Continued)

(52) U.S. Cl.
CPC .......... *B60W 20/106* (2013.01); *B60W 10/20* (2013.01); *B60W 20/00* (2013.01); *B60W 20/13* (2016.01); *B60W 20/50* (2013.01); *B62D 9/00* (2013.01); *B62D 11/003* (2013.01); *B62D 11/04* (2013.01)

(58) Field of Classification Search
CPC ...... B60W 20/00; B60W 20/13; B60W 20/50; B62D 11/003; B62D 11/04
USPC .......................................................... 701/22
See application file for complete search history.

(56) References Cited

U.S. PATENT DOCUMENTS 7,739,005 B1 * 6/2010 Tang .................. B60L 3/10
701/22
2002/0062183 A1 * 5/2002 Yamaguchi .............. B60K 6/46
701/22

(Continued)

FOREIGN PATENT DOCUMENTS

| JP | 2013-67337 A | 4/2013 |
|---|---|---|
| KR | 10-2011-0010345 A | 2/2011 |
| KR | 10-2013-0014683 A | 2/2013 |

*Primary Examiner* — Harry Oh
(74) *Attorney, Agent, or Firm* — Sughrue Mion, PLLC

(57) ABSTRACT

Provided is a method of controlling a vehicle, the method including: determining a driving mode based on a speed of the vehicle and a user-selected driving mode, the determining the driving mode comprising driving the vehicle using power supplied from at least one power supply source of power supply sources, the power supply sources including: 1) first and second engine generators, each configured to generate power by using turning force; 2) a battery charged by the first or second engine generator; and 3) an ultra capacitor charged by the first or second engine generator; and determining an alternative driving mode comprising switching from the at least one power supply source of the power supply sources to another power supply source of the power supply sources to drive the vehicle if a failure occurs in the at least one power supply source of power supply sources.

20 Claims, 9 Drawing Sheets

| No. | POWER SUPPLY | | | DRIVING MODE ACCORDING TO SPEED | SPECIAL MODE / USER-SELECTED DRIVING MODE | | OTHERS |
|---|---|---|---|---|---|---|---|
| 1 | - | BATTERY | - | 1. INITIAL START 2. LOW-SPEED TRAVEL | TURN-IN-PLACE | | |
| 2 | - | - | - | LOW-SPEED TRAVEL | REGENERATIVE BRAKING | LOW-NOISE DRIVING | USE BATTERY UPON OVERDISCHARGE AND OVERCHARGE OF ULTRA CAPACITOR |
| 3 | - | BATTERY | ULTRA CAPACITOR | | TURN-IN-PLACE | | SOC > 0.7 |
| 4 | ONE ENGINE GENERATOR | - | - | MIDDLE-SPEED TRAVEL | ENGINE CRUISE DRIVING | ENERGY SAVING MODE | |
| 5 | ONE ENGINE GENERATOR | BATTERY | - | | BATTERY-CENTRIC DRIVING | | SOC > 0.9 |
| 6 | ONE ENGINE GENERATOR | - | ULTRA CAPACITOR | | ULTRA-CAPACITOR-CENTRIC DRIVING | | SOC > 0.9 |
| 7 | ONE ENGINE GENERATOR | BATTERY | ULTRA CAPACITOR | | BATTERY/ULTRA-CAPACITOR-CENTRIC DRIVING | | SOC > 0.8 |
| 8 | TWO ENGINE GENERATORS | - | - | HIGH-SPEED TRAVEL | ENGINE CRUISE DRIVING | | |
| 9 | TWO ENGINE GENERATORS | BATTERY | - | | BATTERY-CENTRIC DRIVING | | SOC > 0.9 |
| 10 | TWO ENGINE GENERATORS | - | ULTRA CAPACITOR | | ULTRA-CAPACITOR-CENTRIC DRIVING | | SOC > 0.9 |
| 11 | TWO ENGINE GENERATORS | BATTERY | ULTRA CAPACITOR | | HILL CLIMBING DRIVING (MAXIMUM OUTPUT) | | SOC > 0.8 |

(51) Int. Cl.
   *B62D 11/04* (2006.01)
   *B60W 20/50* (2016.01)
   *B62D 9/00* (2006.01)
   *B62D 11/00* (2006.01)
   *B60W 20/13* (2016.01)

(56) References Cited

U.S. PATENT DOCUMENTS

| | | | | |
|---|---|---|---|---|
| 2003/0104899 | A1* | 6/2003 | Keller | B60K 6/24 |
| | | | | 477/2 |
| 2006/0250902 | A1* | 11/2006 | Bender | B60K 6/46 |
| | | | | 369/1 |
| 2007/0068714 | A1* | 3/2007 | Bender | B60K 6/28 |
| | | | | 180/65.29 |
| 2009/0145674 | A1* | 6/2009 | Lee | B60K 6/405 |
| | | | | 180/65.1 |
| 2011/0125356 | A1* | 5/2011 | Takahashi | B60K 6/387 |
| | | | | 701/22 |
| 2011/0246005 | A1* | 10/2011 | King | B60K 6/48 |
| | | | | 701/22 |
| 2013/0030638 | A1* | 1/2013 | Nissato | B60K 6/442 |
| | | | | 701/22 |
| 2014/0228168 | A1* | 8/2014 | Kaufman | B60W 20/20 |
| | | | | 477/5 |

* cited by examiner

FIG. 3

| No. | POWER SUPPLY | | | DRIVING MODE ACCORDING TO SPEED | SPECIAL MODE / USER-SELECTED DRIVING MODE | | OTHERS |
|---|---|---|---|---|---|---|---|
| 1 | — | BATTERY | — | 1. INITIAL START 2. LOW-SPEED TRAVEL | | | |
| 2 | — | — | — | LOW-SPEED TRAVEL | TURN-IN-PLACE | | USE BATTERY UPON OVERDISCHARGE AND OVERCHARGE OF ULTRA CAPACITOR |
| 3 | — | BATTERY | ULTRA CAPACITOR | | REGENERATIVE BRAKING | LOW-NOISE DRIVING | |
| 4 | ONE ENGINE GENERATOR | — | — | | TURN-IN-PLACE | | SOC > 0.7 |
| 5 | ONE ENGINE GENERATOR | BATTERY | — | MIDDLE-SPEED TRAVEL | ENGINE CRUISE DRIVING | | |
| 6 | ONE ENGINE GENERATOR | — | ULTRA CAPACITOR | | BATTERY-CENTRIC DRIVING | ENERGY SAVING MODE | SOC > 0.9 |
| 7 | ONE ENGINE GENERATOR | BATTERY | ULTRA CAPACITOR | | ULTRA-CAPACITOR-CENTRIC DRIVING | | SOC > 0.9 |
| | | | | | BATTERY/ULTRA-CAPACITOR-CENTRIC DRIVING | | SOC > 0.8 |
| 8 | TWO ENGINE GENERATORS | — | — | HIGH-SPEED TRAVEL | ENGINE CRUISE DRIVING | | |
| 9 | TWO ENGINE GENERATORS | BATTERY | — | | BATTERY-CENTRIC DRIVING | | SOC > 0.9 |
| 10 | TWO ENGINE GENERATORS | — | ULTRA CAPACITOR | | ULTRA-CAPACITOR-CENTRIC DRIVING | | SOC > 0.9 |
| 11 | TWO ENGINE GENERATORS | BATTERY | ULTRA CAPACITOR | | HILL CLIMBING DRIVING (MAXIMUM OUTPUT) | | SOC > 0.8 |

APPARATUS AND METHOD FOR CONTROLLING TRAVEL OF VEHICLE

CROSS REFERENCE TO RELATED APPLICATION

This application claims priority from Korean Patent Application No. 10-2013-0164129, filed on Dec. 26, 2013, in the Korean Intellectual Property Office, the disclosure of which is incorporated herein by reference in its entirety.

BACKGROUND

1. Field

Apparatuses and methods consistent with exemplary embodiments relate to controlling travel of a vehicle in which a driving mode of the vehicle is determined based on the speed of the vehicle and a user-selected driving mode, and more particularly to controlling travel of the vehicle when a failure occurs in a power supply that supplies the vehicle with power according to the determined driving mode, the power supply is replaced with another power supply for stable driving.

2. Description of the Related Art

Japanese Patent Application Publication No. 2003-032807 discloses that a vehicle is switched by a hybrid vehicle control device between an electric vehicle (EV) mode in which the vehicle travels by using a battery alone, an engine mode in which the vehicle travels by using an engine alone, and a hybrid electric vehicle (HEV) mode in which the vehicle travels by using the battery and the engine together according to stored road data.

Such related art technology merely enables a switch between the three driving modes based on road data, and does not reflect the output or battery/engine state of a vehicle. In addition, a means and method for storing data about a driving region are necessary for the related art. In other words, the related art will reach to the limit of storage capacity and involve additional cost for the storage means.

SUMMARY

One or more exemplary embodiments provide an apparatus and method for controlling travel of a vehicle in which a driving mode of the vehicle is determined based on the speed of the vehicle and a driving mode selected by a user, and when a failure occurs in a power supply that supplies the vehicle with power according to the determined driving mode, the power supply is replaced with another power supply for stable driving.

Additional aspects will be set forth in part in the description which follows and, in part, will be apparent from the description, or may be learned by practice of the presented embodiments.

According to an aspect of an exemplary embodiment, there is provided a method of controlling a vehicle, the method including: determining a driving mode based on a speed of the vehicle and a user-selected driving mode, the determining the driving mode comprising driving the vehicle using power supplied from at least one power supply source of power supply sources, the power supply sources including: first and second engine generators, each configured to generate power by using turning force; a battery charged by the first or second engine generator; and an ultra capacitor charged by the first or second engine generator; and determining an alternative driving mode comprising switching from the at least one power supply source of the power supply sources to another power supply source of the power supply sources to drive the vehicle if a failure occurs in the at least one power supply source of power supply sources.

The determining the driving mode may include: receiving a user selection of a low-noise driving mode at a first speed; turning off the first and second engine generators; and driving the vehicle using power supplied from at least one of the battery and the ultra capacitor.

The determining the driving mode may further include: reducing a maximum available output and a highest speed of the vehicle; and driving the vehicle at the first speed in response to receiving an acceleration command for a speed greater than or equal to the first speed.

The determining the driving mode may include: receiving a user selection of a turn-in-place driving mode at a first speed; supplying the power from the first and second engine generators, power from the battery, and power from the ultra capacitor; and driving the vehicle to turn in place by operating a first steering system configured to turn the vehicle using the supplied power and a skid caused by a difference in driving force between left and right wheels.

The determining the alternative driving mode may include: if failures occur in the first and second engine generators, operating a second steering system configured to turn the vehicle about a center of a turning circle; and driving the vehicle to turn in place by operation of the first and second steering systems.

The determining the alternative driving mode may include: if a failure occurs in the battery, operating a second steering system configured to turn the vehicle about a center of a turning circle; and driving the vehicle to turn in place by operation of the first and second steering systems.

The determining the driving mode may further include: receiving a user selection of a battery-centric driving mode or an ultra-capacitor-centric driving mode at a second speed higher than the first speed; and driving the vehicle using power supplied from the battery and one of the first and second engine generators, or power supplied from the ultra capacitor and one of the first and second engine generators.

The determining the alternative driving mode may include: checking a state of charge (SOC) of the battery or a capacitance of the ultra capacitor; and if the SOC of the battery or the capacitance of the ultra capacitor is smaller than a reference value, charging the battery or the ultra capacitor with power supplied from the other one of the first and second engine generators.

The determining the driving mode may further include: receiving a user selection of a battery-centric driving mode or an ultra-capacitor-centric driving mode at a third speed higher than the second speed; and driving the vehicle using the power supplied from the first and second engine generators and the battery, or the power supplied from the first and second engine generators and the ultra capacitor.

The determining the alternative driving mode may include: checking a state of charge (SOC) of the battery or a capacitance of the ultra capacitor; if the SOC of the battery or the capacitance of the ultra capacitor is smaller than a reference value, controlling one of the first and second engine generators to exclusively charge the battery or the ultra capacitor; and continuously driving the vehicle by power supplied from the other one of the first and second engine generators.

The method may further include: checking the SOC of the battery or the capacitance of the ultra capacitor in response to a power corresponding to an acceleration command input exceeding a driving output; and if a value of the SOC of the battery or the capacitance of the ultra capacitor is greater than or equal to the reference value, controlling the one of the first and second engine generators to stop charging the battery and to additionally supply power for the driving output.

The method may further include controlling the one of the first and second engine generators to exclusively charge the battery or the ultra capacitor in response to the power used according to the acceleration command input not exceeding the driving output.

The driving the vehicle may include driving the vehicle by power supplied from the first and second engine generators, the battery, and the ultra capacitor.

The determining the alternative driving mode may include: determining that a failure occurring in the first engine generator; and driving the vehicle by power supplied from the second engine generator, the battery, and the ultra capacitor.

The determining the alternative driving mode may include: determining that a failure occurring in the second engine generator; and driving the vehicle by power supplied from the first engine generator, the battery, and the ultra capacitor.

The determining the alternative driving mode may include: determining that failures occurring in the first and second engine generators; and driving the vehicle by power supplied from the battery and the ultra capacitor.

The determining the alternative driving mode may include: determining that a failure occurring in the battery; and driving the vehicle using power supplied from the first and second engine generators and the ultra capacitor.

The determining the alternative driving mode may include: determining that a failure occurring in the ultra capacitor; and driving the vehicle by power supplied from the first and second engine generators and the battery.

The determining the alternative driving mode may include: determining that failures occurring in the battery and the ultra capacitor; and driving the vehicle by power supplied from the first and second engine generators.

According to an aspect of another exemplary embodiment, there is provided an apparatus for controlling travel of a vehicle including first and second engine generators configured to generate first and second power supplies, respectively, by using turning force of an engine; a battery charged with a third power supply by the first or second engine generator; an ultra capacitor charged with a fourth power supply by the first or second engine generator; and a controller configured to drive the vehicle using at least one of the first, second, third and fourth power supplies based on a speed of the vehicle and a user-selected driving mode, and configured to switch from the at least one of the first, second, third and fourth power supplies to another one of the first, second, third and fourth power supplies, if a failure occurs in the at least one of the first, second, third and fourth power supplies.

BRIEF DESCRIPTION OF THE DRAWINGS

The above and/or other aspects will become apparent and more readily appreciated from the following description of the exemplary embodiments, taken in conjunction with the accompanying drawings in which:

FIG. 3 is a table showing operation/stop of a plurality of power supplies based on the speed of a vehicle according to an exemplary embodiment and a driving mode selected by a user;

DETAILED DESCRIPTION

Figure 1:
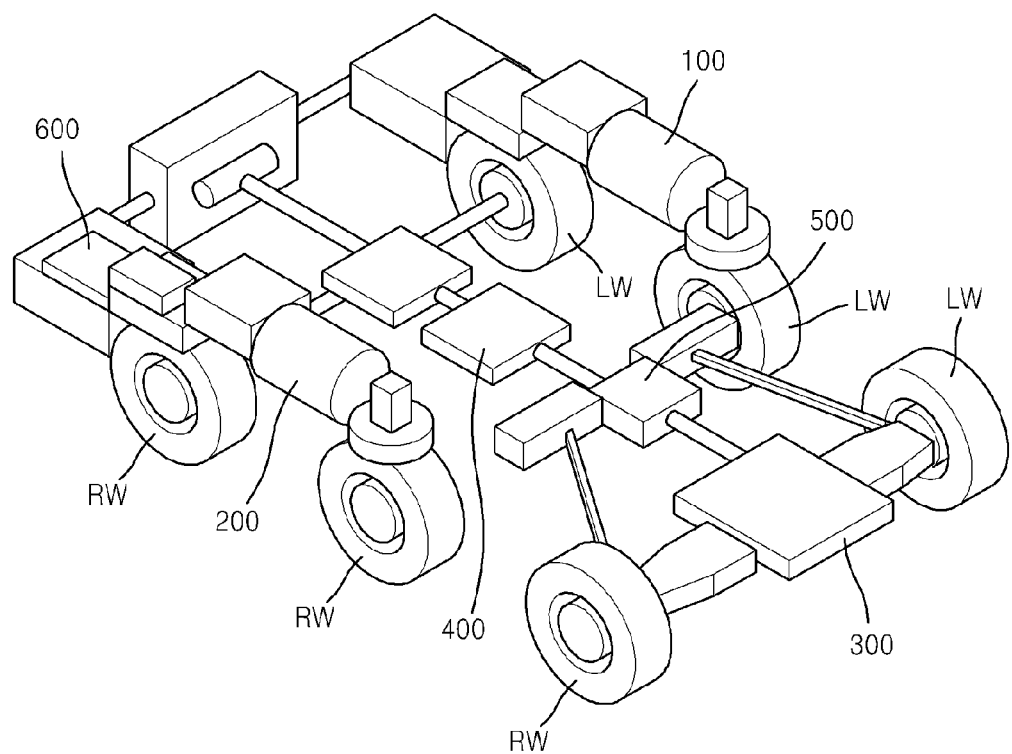
FIG. 1 is an exploded perspective view of a vehicle according to an exemplary embodiment.

The inventive concepts allow various kinds of modification and can have many exemplary embodiments, and particular exemplary embodiments are illustrated in the drawings and described in detail herein. However, it is to be understood that the particular exemplary embodiments do not limit the inventive concepts to a particular exemplary embodiment but rather include every modified, equivalent, or replaced one within the spirit and technical scope of the inventive concept. In the description of the inventive concepts, if it is determined that a detailed description of related art may obscure the gist of the inventive concepts, the detailed description will be omitted.

Although terms, such as "first" and "second", may be used to describe various elements, the elements are not limited by these terms. These terms are only used to differentiate one element from another element.

The terminology used in this application is used to describe particular exemplary embodiments and does not limit the inventive concepts. An expression in the singular includes an expression in the plural unless they are clearly different from each other in context. In this application, terms, such as "include" and "have", are used to indicate the existence of features, numbers, steps, operations, elements, parts, or combinations thereof mentioned herein without excluding in advance the possibility of existence or addition of one or more other features, numbers, steps, operations, elements, parts, or combinations thereof. As used herein, the term "and/or" includes any and all combinations of one or more of the associated listed items. Expressions such as "at least one of," when preceding a list of elements, modify the entire list of elements and do not modify the individual elements of the list.

The exemplary embodiments may be realized as functional blocks and various processing steps. The functional blocks may be realized as a plurality of hardware and/or software elements which execute specific functions. For example, exemplary embodiments may adopt integrated circuits (ICs), such as a memory, processing, logic, a look-up table, etc., capable of executing various functions through controls of one or more microprocessors or other controlling apparatuses. Like elements of exemplary embodiments which may be executed by software programming or software elements, the exemplary embodiments may be realized in programming or scripting languages, such as C, C++, Java, assembler, etc., to include various algorithms which are realized as combinations of data structures, processes, routines, or other programming structures. Functional aspects may be realized by using algorithms which are executed by one or more processors. Also, exemplary embodiments may adopt existing techniques for electronic environment setting, signal processing, data processing, and/or so on. The terms, such as "mechanism," "element," "means," and "constitution" may be used in their wide meanings and may not be limited as mechanical and physical constitutions. The terms may include the meanings of a series of routines of software in connection with a processor, and so on.

Hereinafter, exemplary embodiments will be described more fully with reference to the accompanying drawings. In the description with reference to the drawings, like reference numerals in the drawings denote like elements, and repetitive descriptions thereof will be omitted.

Figure 2:
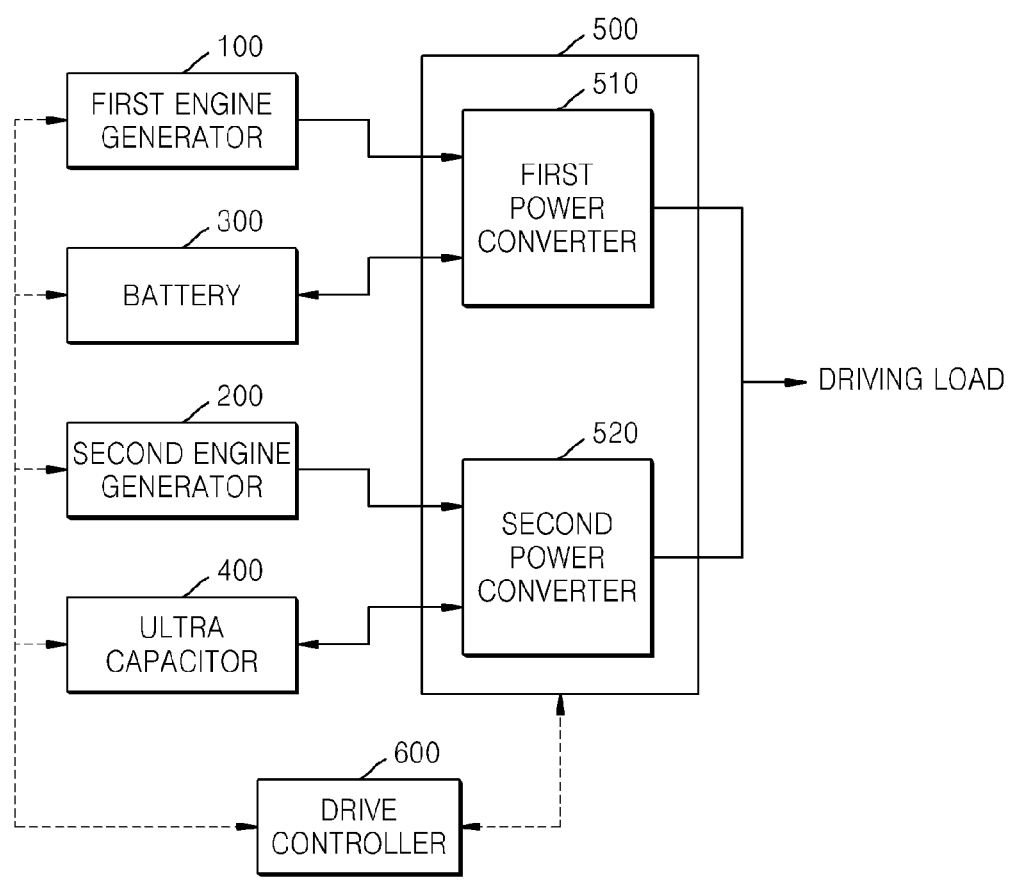
FIG. 2 is a block diagram of an apparatus for controlling travel of a vehicle according to an exemplary embodiment.

FIG. 1 is an exploded perspective view of a vehicle according to an exemplary embodiment. FIG. 2 is a block diagram of an apparatus for controlling travel of a vehicle according to an exemplary embodiment.

Referring to FIGS. 1 and 2, an apparatus for controlling travel of a vehicle includes a first engine generator 100, a second engine generator 200, a battery 300, an ultra capacitor 400, a power converter 500, and a drive controller 600.

The first engine generator 100 and the second engine generator 200 generate power (electric energy) by using turning force (power energy) of an engine. The power generated by the first engine generator 100 and the second engine generator 200 is used for travel of the vehicle, and charging the battery 300 and the ultra capacitor 400.

The battery 300 may be charged by the first engine generator 100 or the second engine generator 200, and power discharged from the battery 300 is used to drive the vehicle. Although not shown in the drawing, a battery management system (BMS) for managing the battery 300 may be included to monitor a state of the battery 300.

The ultra capacitor 400 may be charged by the first engine generator 100 or the second engine generator 200, and power discharged from the ultra capacitor 400 may be used to drive the vehicle. Since the battery 300 is expensive, the ultra capacitor 400 is necessary to reduce the number of times of charging/discharging of the battery 300 and maintain a small difference between a charging voltage and a discharge voltage. In other words, the ultra capacitor 400 serves as a buffer for reducing the difference between the charging and discharging voltages of the battery 300. In comparison with the battery 300, the ultra capacitor 400 does not have a large capacitance but may be rapidly charged or discharged. Therefore, the combined use of the battery 300 and the ultra capacitor 400 may create a synergy effect.

As a controller that operates the first engine generator 100, the second engine generator 200, the battery 300, and the ultra capacitor 400 in a stable state, the power converter 500 controls the output powers of the first engine generator 100 and the second engine generator 200, distributes power outputs from the first engine generator 100 and the second engine generator 200, and converts the distributed power into power for charging the battery 300 and the ultra capacitor 400. Also, the power converter 500 outputs a power output from at least one of the first engine generator 100, the second engine generator 200, the battery 300, and the ultra capacitor 400 to driving loads (a driving motor, a steering motor. etc.), thereby driving the vehicle.

The vehicle may include one power converter 500. However, the exemplary embodiments are not limited thereto. As in the case of FIG. 2, the vehicle may include two power converters 500 including a first power converter 510 and a second power converter 520. When the vehicle includes only one the power converter 500, overall power control may be managed in an integrated fashion, but damage to the power converter 500 makes power control impossible.

When the vehicle includes two the power converters including the first power converter 510 and the second power converter 520, the first power converter 510 may control power of the first engine generator 100 and the battery 300, and the second power converter 520 may control power of the second engine generator 200 and the ultra capacitor 400. In this case, even when any one of the first power converter 510 and the second power converter 520 is damaged, the other one enables continuous power control. However, when the power converter 500 includes the first power converter 510 and the second power converter 520, it is not possible for the first power converter 510 and the second power converter 520 to know details of power use or operating states of each other. Therefore, an upper-level controller is necessary to manage the first power converter 510 and the second power converter 520 in an integrated fashion, and the drive controller 600 may serve as the upper-level controller.

The drive controller 600 receives a command of a driver (user), generates a drive command of the vehicle, transmits a power-requesting command to the power converter 500, and transmits operation/stop commands of the first engine generator 100 as a first power supply, the second engine generator 200 as a second power supply, the battery 300 as a third power supply, and the ultra capacitor 400 as a fourth power supply. In the exemplary embodiment, the drive controller 600 may drive the vehicle using power supplied from at least one of the first, second, third and fourth power supplies based on the speed of the vehicle and a user-selected driving mode, and may switch or replace, when a failure occurs in at least one of the first to fourth power supplies, the at least one power supply with another power supply. In the exemplary embodiment, the vehicle of which travel is controlled by the drive controller 600 may be a combat vehicle for a special purpose, but is not limited thereto.

FIG. 3 is a table showing operation/stop of the first to fourth power supplies controlled by the drive controller 600 based on the speed of the vehicle and a user-selected driving mode according to an exemplary embodiment.

Referring to FIG. 3, when the vehicle is initially started or travels at a first speed (low speed, e.g., 10 km/h or less), the drive controller 600 may control the battery 300, the ultra capacitor 400, or the battery 300 and the ultra capacitor 400 to discharge, thereby supplying power.

At this time, a low-noise driving mode may be selected as a special mode selected by the user. In the low-noise driving mode, the first engine generator 100 and the second engine generator 200 are turned off, and the vehicle is driven by power supplied from at least one of the battery 300 and the ultra capacitor 400. An additional button (not shown) may be prepared for selecting the special mode, and it is possible to enter the special mode by pressing the button.

As special modes, the low-noise driving mode may include a turn-in-place driving mode and a regenerative-brake driving mode. When the turn-in-place driving mode is selected, the drive controller 600 may discharge the battery 300 or the battery 300 and the ultra capacitor 400. When a state of charge (SOC) of the battery 300 is a first reference value, for example, greater than or equal to 0.4 and smaller than 0.9, the drive controller 600 may discharge the battery 300 and the ultra capacitor 400. Although not shown in the drawing, when a turn-in-place is performed several times in the turn-in-place driving mode of the low-noise driving mode, there may be a lack of an output. In this case, the drive controller 600 may turn on the first and second engine generators 100 and 200, thereby supplementing the inadequate output. When a turn-in-place is performed by turning on the first and second engine generators 100 and 200, a general turn-in-place driving mode rather than a low-noise turn-in-place driving mode may be selected. When the regenerative-brake driving mode is selected, the drive controller 600 may charge the ultra capacitor 400 by using regenerative power generated by regenerative braking. When the ultra capacitor 400 is overcharged in the regenerative-brake driving mode, the drive controller 600 may charge the battery 300 with the regenerative power.

When the vehicle travels at a second speed (middle speed, e.g., 10 km/h to 50 km/h), the drive controller 600 may drive the vehicle by power supplied from any one of the first and second engine generators 100 and 200, power supplied from the battery 300 and any one of the first and second engine generators 100 and 200, power supplied from the ultra capacitor 400 and any one of the first and second engine generators 100 and 200, or power supplied from the battery 300, the ultra capacitor 400, and any one of the first and second engine generators 100 and 200.

At this time, an energy-saving driving mode may be selected as a special mode. The energy-saving driving mode may include an engine cruise driving mode, a battery-centric driving mode, an ultra-capacitor-centric driving mode, and a battery/ultra-capacitor-centric driving mode.

When the engine cruise driving mode is selected, the drive controller 600 may control travel of the vehicle according to a power supplied by turning on any one of the first and second engine generators 100 and 200 and a first engine curve (not shown) that indicates an efficient output according to previously stored little energy.

When the battery-centric driving mode is selected, the drive controller 600 may drive the vehicle by power supplied from the battery 300 and any one of the first and second engine generators 100 and 200. In the battery-centric driving mode of the second speed, a condition for the drive controller 600 to use power supplied from the battery 300, that is, a discharge condition of the battery 300, is that the SOC of the battery 300 is a second reference value (e.g., 0.9) or more.

When the ultra-capacitor-centric driving mode is selected, the drive controller 600 may drive the vehicle by power supplied from the ultra capacitor 400 and any one of the first and second engine generators 100 and 200. In the ultra-capacitor-centric driving mode of the second speed, a condition for the drive controller 600 to use power supplied from the ultra capacitor 400, that is, a discharge condition of the ultra capacitor 400, is that the SOC of the ultra capacitor 400 is the second reference value (e.g., 0.9) or more.

When the battery/ultra-capacitor-centric driving mode is selected, the drive controller 600 may drive the vehicle by power supplied from the battery 300, the ultra capacitor 400, and any one of the first and second engine generators 100 and 200. In the battery/ultra-capacitor-centric driving mode of the second speed, a condition for the drive controller 600 to use power supplied from the battery 300 and the ultra capacitor 400, that is, a discharge condition of the battery 300 and the ultra capacitor 400, is that the SOCs of the battery 300 and the ultra capacitor 400 are a third reference value (e.g., 0.8) or more.

When the SOC of the battery 300 or the ultra capacitor 400 becomes the first reference value, for example, greater than or equal to 0.4 and smaller than 0.9 in the energy-saving driving mode of the second speed, the drive controller 600 may charge the battery 300 or the ultra capacitor 400 by turning on the other one of the first and second engine generators 100 and 200. In the energy-saving driving mode of the second speed, the output of any one the first and second engine generators 100 and 200 and the amount of use of the battery 300 and the ultra capacitor 400 may be controlled by the power converter 500 under the control of the drive controller 600.

When the vehicle travels at a third speed (high speed, e.g., 50 km/h or more), the drive controller 600 may drive the vehicle by power supplied by turning on the first and second engine generators 100 and 200, power supplied from the battery 300 and the first and second engine generators 100 and 200, power supplied from the ultra capacitor 400 and the first and second engine generators 100 and 200, or power supplied from the battery 300, the ultra capacitor 400, and the first and second engine generators 100 and 200.

At this time, an energy-saving driving mode and a hill-climbing (maximum output) driving mode may be selected as a special driving mode. The energy-saving driving mode may include an engine cruise driving mode, a battery-centric driving mode, and an ultra-capacitor-centric driving mode.

When the engine cruise driving mode is selected, the drive controller 600 may control travel of the vehicle according to a power supplied by turning on the first and second engine generators 100 and 200 and a second engine curve (not shown) that indicates an efficient output according to previously stored little energy. There is difference in the output of an engine generator between the engine cruise driving mode of the second speed and the engine cruise driving mode of the third speed. In other words, since the third speed is higher than the second speed, the output of the engine generators in the engine cruise driving mode of the third speed is higher than the output of an engine generator in the engine cruise driving mode of the second speed.

When the battery-centric driving mode is selected, the drive controller 600 may drive the vehicle by power supplied from the battery 300 and the first and second engine generators 100 and 200. In the battery-centric driving mode of the third speed, a condition for the drive controller 600 to cause the battery 300 to discharge is that the SOC of the battery 300 is the second reference value (e.g., 0.9) or more.

When the ultra-capacitor-centric driving mode is selected, the drive controller 600 may drive the vehicle by power supplied from the ultra capacitor 400 and the first and second engine generators 100 and 200. In the ultra-capacitor-centric driving mode of the third speed, a condition for the drive controller 600 to cause the ultra capacitor 400 to discharge is that the SOC of the ultra capacitor 400 is the second reference value (e.g., 0.9) or more.

When the SOC of the battery 300 or the ultra capacitor 400 becomes the first reference value, for example, greater than or equal to 0.4 and smaller than 0.9 in the energy-saving driving mode of the third speed, the drive controller 600 may operate any one of the first and second engine generators 100 and 200 to be exclusively responsible for charging the battery 300 or the ultra capacitor 400. When charging of the battery 300 or the ultra capacitor 400 is finished, the battery 300 or the ultra capacitor 400 may be restored to supply power to driving loads. In the energy-saving driving mode of the third speed, the amount of use of the first and second engine generators 100 and 200, the battery 300, and the ultra capacitor 400 may be controlled by the power converter 500 under the control of the drive controller 600.

When the hill-climbing mode is selected, the drive controller 600 may drive the vehicle by power supplied from the first and second engine generators 100 and 200, the battery 300, and the ultra capacitor 400. In the hill-climbing mode, a condition for the drive controller 600 to cause the battery 300 and the ultra capacitor 400 to discharge is that the SOCs of the battery 300 and the ultra capacitor 400 are the third reference value (e.g., 0.8) or more.

In addition, when a failure occurs while the vehicle is traveling on power supplied from at least one of the first, second, third and fourth power supplies, the drive controller 600 may replace the at least one power supply with another power supply, thus continuously driving the vehicle.

Methods of controlling travel of a vehicle according to exemplary embodiments will be described below with reference to FIGS. 4 to 9. As shown in FIGS. 1 and 2, the methods of controlling travel of a vehicle according to the exemplary embodiments may be performed by the drive controller 600 with the aid of other components. In the following description, the same part as described with reference to FIGS. 1 to 3 will be omitted.

Figure 4:
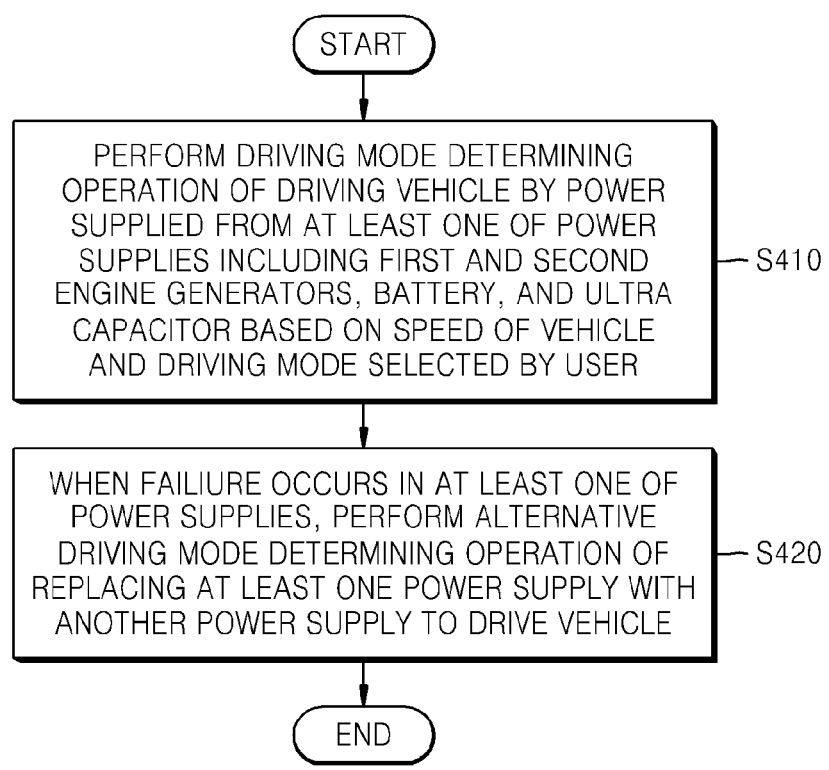
FIG. 4 is a flowchart of a method of controlling travel of a vehicle according to an exemplary embodiment.

FIG. 4 is a flowchart of a method of controlling travel of a vehicle according to an exemplary embodiment. Referring to FIG. 4, based on the speed of the vehicle and a driving mode selected by a user, the drive controller 600 performs a driving mode determining operation (operation 410) of driving the vehicle by power supplied from at least one of the first engine generator 100 as a first power supply, the second engine generator 200 as a second power supply, the battery 300 as a third power supply, and the ultra capacitor 400 as a fourth power supply. The driving mode determining operation has been described in detail above with reference to FIG. 3, and the detailed description thereof will not be reiterated.

When a failure occurs in at least one of the first to fourth power supplies while the vehicle is traveling in the determined driving mode, the drive controller 600 performs an alternative driving mode determining operation (operation 420) of replacing the at least one power supply with another power supply to drive the vehicle. Upon the determination of an alternative driving mode, it may not be possible for the vehicle to travel at a speed according to the determined driving mode. However, the vehicle may continue traveling, and thus it is possible to suitably cope with an emergency situation.

Figure 5:
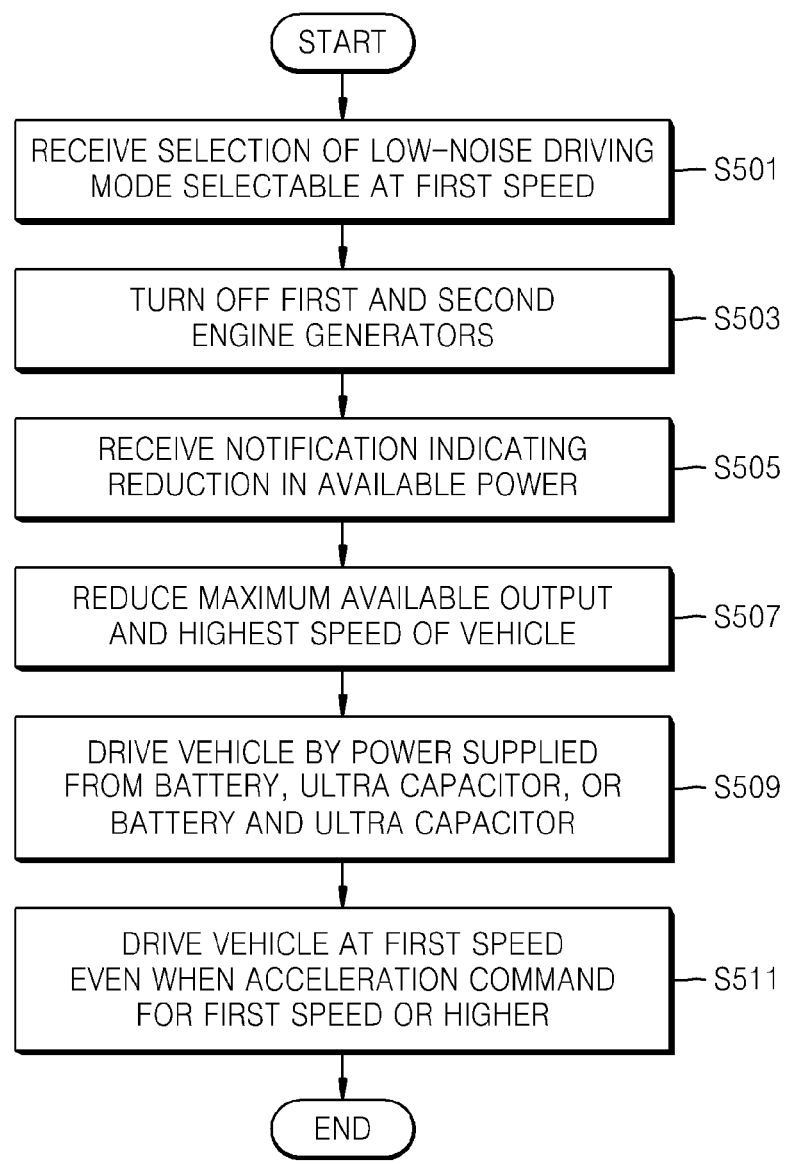
FIGS. 5 to 9 are flowcharts of methods of controlling travel of a vehicle based on the speed of the vehicle and a driving mode selected by a user according to various exemplary embodiments.

FIG. 5 is a flowchart illustrating a method of controlling travel of a vehicle in the low-noise driving mode according to an exemplary embodiment.

Referring to FIG. 5, the drive controller 600 performs an operation of receiving a selection of a low-noise driving mode that may be selected at the first speed (operation 501).

When the selection of an available low-noise driving mode is received, the drive controller 600 performs an operation of finishing the operation of the first and second engine generators 100 and 200 (operation 503).

When the operation of the first and second engine generators 100 and 200 is finished, there may be a lack of power for operating driving loads. Therefore, an operation in which the power converter 500 notifies the drive controller 600 that available power may be reduced, and the drive controller 600 receives the notification indicating a reduction in available power is performed (operation 505).

The drive controller 600 receiving the notification indicating a reduction in available power performs an operation of reducing the maximum available output and the highest speed of the vehicle (operation 507).

Subsequently, the drive controller 600 performs an operation of driving the vehicle by power supplied from the battery 300, the ultra capacitor 400, or the battery 300 and the ultra capacitor 400 (operation 509).

Even when an acceleration command for the first speed or higher is received in the low-noise driving mode, the drive controller 600 performs an operation of driving the vehicle at the first speed (operation 511).

Figure 6:
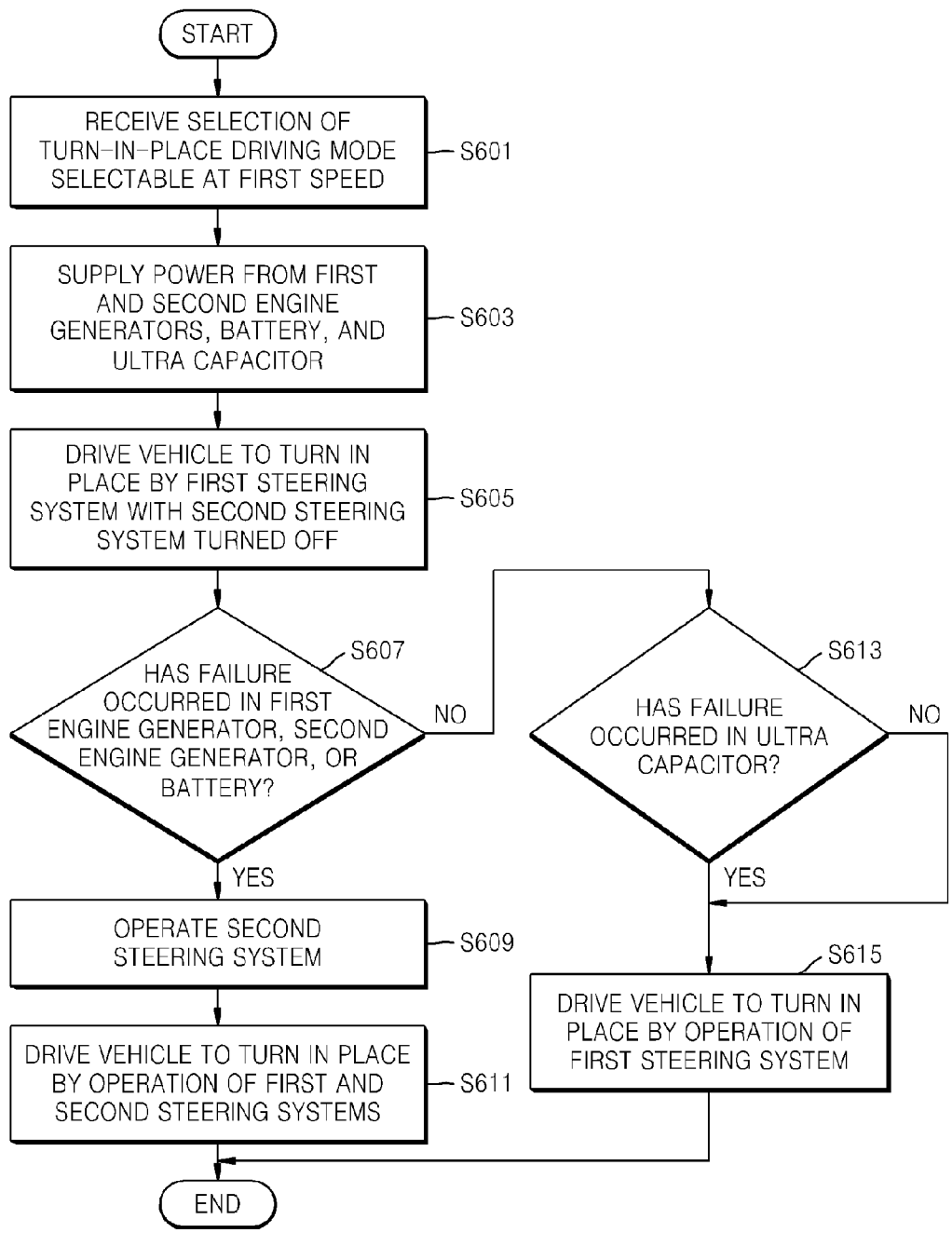

FIG. 6 is a flowchart illustrating a method of controlling travel of a vehicle in the turn-in-place driving mode according to an exemplary embodiment.

Referring to FIG. 6, the drive controller 600 performs an operation of receiving a selection of the turn-in-place driving mode that may be selected at the first speed (operation 601). Here, the turn-in-place driving mode may be the general turn-in-place driving mode.

When the selection of the turn-in-place driving mode is received, the drive controller 600 performs an operation of supplying power from the first and second engine generators 100 and 200, the battery 300, and the ultra capacitor 400 (operation 603). Here, the turn-in-place driving mode is based on a first steering system. The first steering system requires a high output at the first speed, and thus all the power supplies may be operated if possible. Here, the first steering system is a skid steering system that enables turning of the vehicle by using supplied power and a skid caused by a difference in driving force between left and right wheels LW and RW (See FIG. 1).

Subsequently, the controller 600 performs an operation of driving the vehicle to turn in place according to the first steering system without the operation of a second steering system (operation 605). Here, the second steering system is an Ackerman steering system that enables the vehicle to turn about the center of a turning circle. The first steering system, that is, the skid steering system, requires a high output and has low accuracy in steering, but is effective at in-place steering for one full turning. On the other hand, the second steering system, that is, the Ackerman steering system, operates at a lower output than the first steering system, but has high accuracy in steering and is used in general vehicles.

While the vehicle is driven to turn in place by power supplied from the first and second engine generators 100 and 200, the battery 300, and the ultra capacitor 400 by using the first steering system, the drive controller 600 performs an operation of determining whether a failure has occurred in the first engine generator 100, the second engine generator 200, or the battery 300 (operation 607). Failures may occur in the first and second engine generators 100 and 200 when there is a lack of output power while the vehicle is being driven to turn in place by the first steering system. Also, a failure may occur in the battery 300 when there is a lack of initial driving output power for a turn-in-place of the vehicle by the first steering system.

When a failure occurs in the first engine generator 100, the second engine generator 200, or the battery 300, the drive controller 600 performs an operation of controlling the second steering system to operate (operation 609), and an operation of driving the vehicle to turn in place by the operation of the first and second steering systems (operation 611). When a turn-in-place is performed by using the first and second steering systems, the turning radius is larger than that in the case of using the first steering system but smaller than that in the case of using the second steering system alone.

While the vehicle is driven to turn in place by power supplied from the first and second engine generators 100 and 200, the battery 300, and the ultra capacitor 400, the drive controller 600 performs an operation of determining whether a failure has occurred in the ultra capacitor 400 (operation 613).

A failure occurs in the ultra capacitor 400 when there is a slight lack of output power while the vehicle is being driven to turn in place by the first steering system. In this case, the drive controller 600 performs an operation of driving the vehicle to turn in place by the operation of the first steering system (operation 615). The drive controller 600 may use the entire power of the battery 300 upon the initial operation of the first steering system, and the first and second engine generators may provide entire power upon the continuation of a turn-in-place by the first steering system.

In addition, when the low-noise turn-in-place driving mode is selected, the drive controller 600 may stop the operation of the first and second engine generators 100 and 200, and operate the first steering system by power supplied from the battery 300 or the battery 300 and the ultra capacitor 400, thereby performing a low-noise turn-in-place. When the low-noise turn-in-place is performed several times and there is a lack of an output, the drive controller 600 may operate the second steering system and perform the low-noise turn-in-place by the first and second steering systems. When the low-noise turn-in-place is performed by the first and second steering systems and there is a lack of an output, the drive controller 600 may turn on the first and second engine generators 100 and 200 to supplement inadequate power. Here, when the first and second engine generators 100 and 200 are turned on during the low-noise turn-in-place, the low-noise turn-in-place driving mode is switched to the general turn-in-place driving mode.

Figure 7:
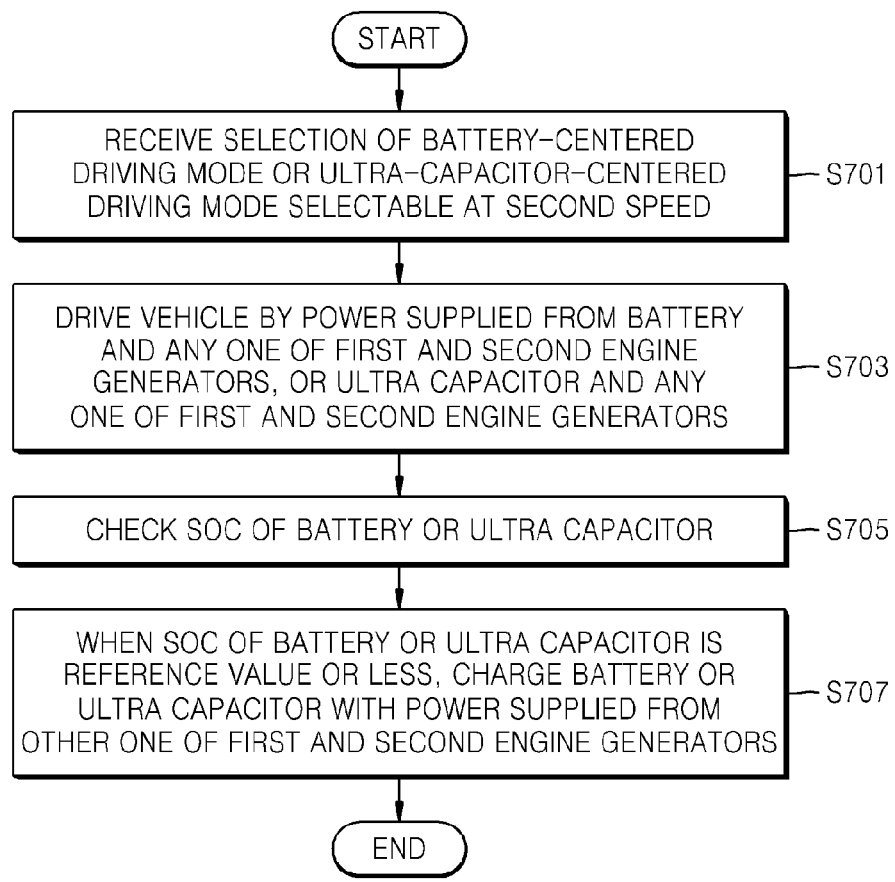

FIG. 7 is a flowchart illustrating a method of controlling travel of a vehicle in the battery-centric or ultra-capacitor-centric driving mode of the second speed according to an exemplary embodiment.

Since the battery 300 is expensive, the method includes a method of coping with frequent charging and discharging to maintain the best condition of the battery 300 for a long life span. In this method, the SOC of the battery 300 is checked and maintained at a fixed level or higher.

Referring to FIG. 7, the drive controller 600 performs an operation of receiving a selection of the battery-centric driving mode or the ultra-capacitor-centric driving mode that may be selected at the second speed (operation 701).

When the selection of the battery-centric driving mode or the ultra-capacitor-centric driving mode is received, the drive controller 600 performs an operation of driving the vehicle by power supplied from the battery 300 and any one of the first and second engine generators 100 and 200 or the ultra capacitor 400 and any one of the first and second engine generators 100 and 200 (operation 703).

During travel of the vehicle, the drive controller 600 performs an operation of checking the SOC of the battery 300 or the ultra capacitor 400 (operation 705).

When the SOC is checked to be the third reference value (e.g., 0.8) or less, the drive controller 600 performs an operation of charging the battery 300 or the ultra capacitor 400 with power supplied by turning on the other one of the first and second engine generators 100 and 200 (operation 707).

Figure 8:
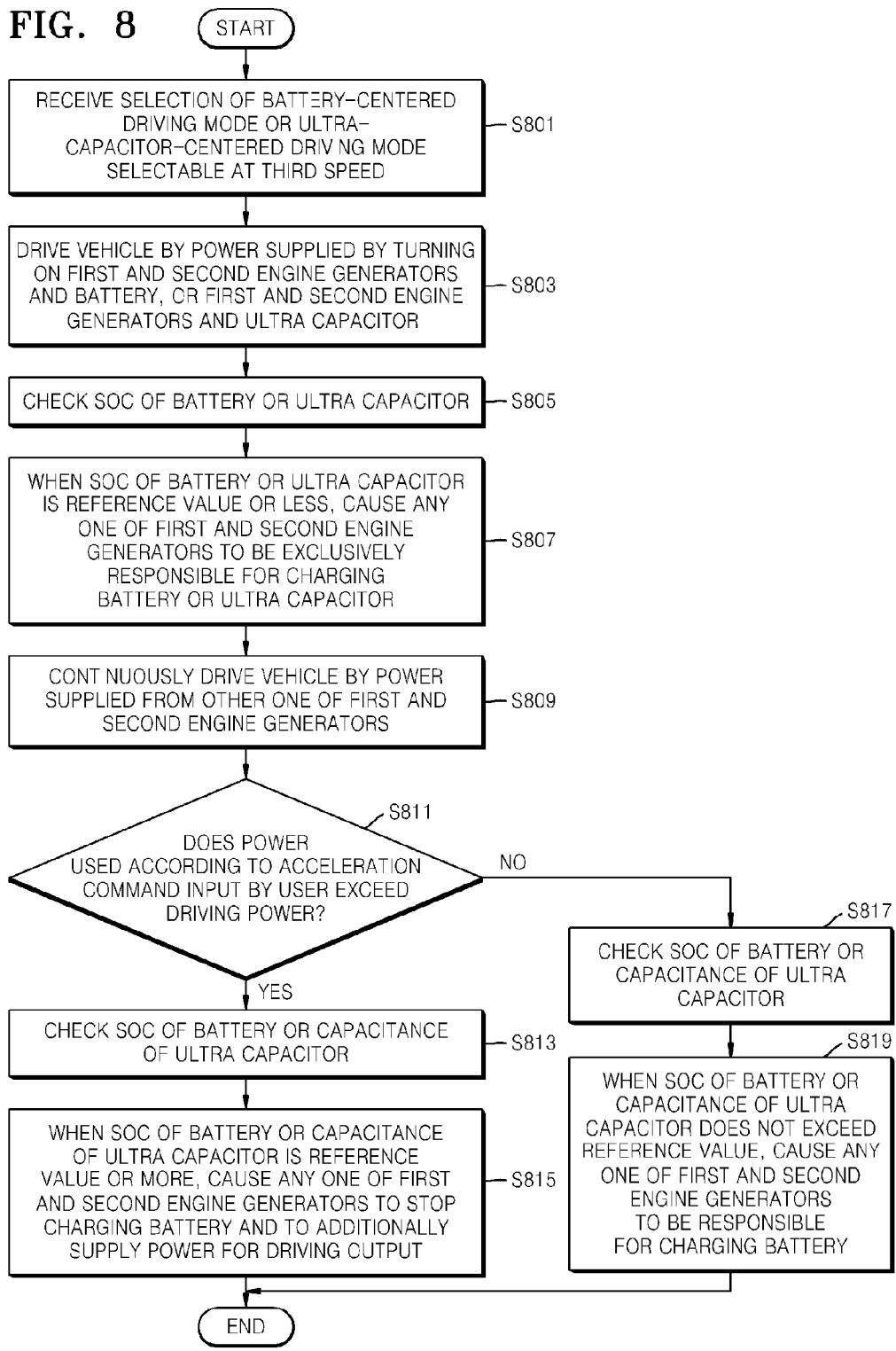

FIG. 8 is a flowchart illustrating a method of controlling travel of a vehicle in the battery-centric or ultra-capacitor-centric driving mode of the third speed according to an exemplary embodiment.

Referring to FIG. 8, the drive controller 600 performs an operation of receiving a selection of the battery-centric driving mode or the ultra-capacitor-centric driving mode that may be selected at the third speed (operation 801).

When the selection of the battery-centric driving mode or the ultra-capacitor-centric driving mode is received, the drive controller 600 performs an operation of driving the vehicle by power supplied from the first and second engine generators 100 and 200 and the battery 300 or the first and second engine generators 100 and 200 and the ultra capacitor 400 (operation 803).

During travel of the vehicle, the drive controller 600 performs an operation of checking the SOC of the battery 300 or the ultra capacitor 400 (operation 805).

When the SOC is checked to be the third reference value (e.g., 0.8 with respect to 1) or less, the drive controller 600 performs an operation of selecting any one of the first and second engine generators 100 and 200 to be exclusively responsible for charging the battery 300 or the ultra capacitor 400 and charging the battery 300 or the ultra capacitor 400 (operation 807).

Also, the drive controller 600 performs an operation of continuously driving the vehicle by power supplied from the other one of the first and second engine generators 100 and 200 (operation 809).

Subsequently, the drive controller 600 performs an operation of determining whether a power used according to an acceleration command input by the user exceeds a driving output (operation 811).

When the power used according to the acceleration command input by the user exceeds the driving output, the drive controller 600 performs an operation of checking the SOC of the battery 300 or the ultra capacitor 400 (operation 813).

When the SOC is checked to be the third reference value (e.g., 0.8 with respect to 1) or more, the drive controller 600 performs an operation of controlling any one of the first and second engine generators 100 and 200 to stop charging the battery 300 or the ultra capacitor 400 and to additionally supply power for the driving output (operation 815).

On the other hand, when the power used according to the acceleration command input by the user does not exceed the driving output, the drive controller 600 performs an operation of checking the SOC of the battery 300 or the ultra capacitor 400 (operation 817).

When the SOC is checked to be the third reference value (e.g., 0.8) or less, the drive controller 600 performs an operation of controlling any one of the first and second engine generators 100 and 200 to exclusively charge the battery 300 or the ultra capacitor 400 (operation 819).

A problem of an existing hybrid vehicle is in that the SOC of a battery is severely consumed when a battery and an engine generator are used for a driving output. However, in the exemplary embodiment, any one of the first and second engine generators 100 and 200 may exclusively and continuously charge the battery 300 or the ultra capacitor 400 for a fixed SOC, and the other one of the first and second engine generators 100 and 200 may exclusively use a driving output. Subsequently, when the SOC of the battery or the ultra capacitor 400 is at an adequate level, the engine generator for charging the battery 300 or the ultra capacitor 400 may also be used for the driving output again.

Figure 9:
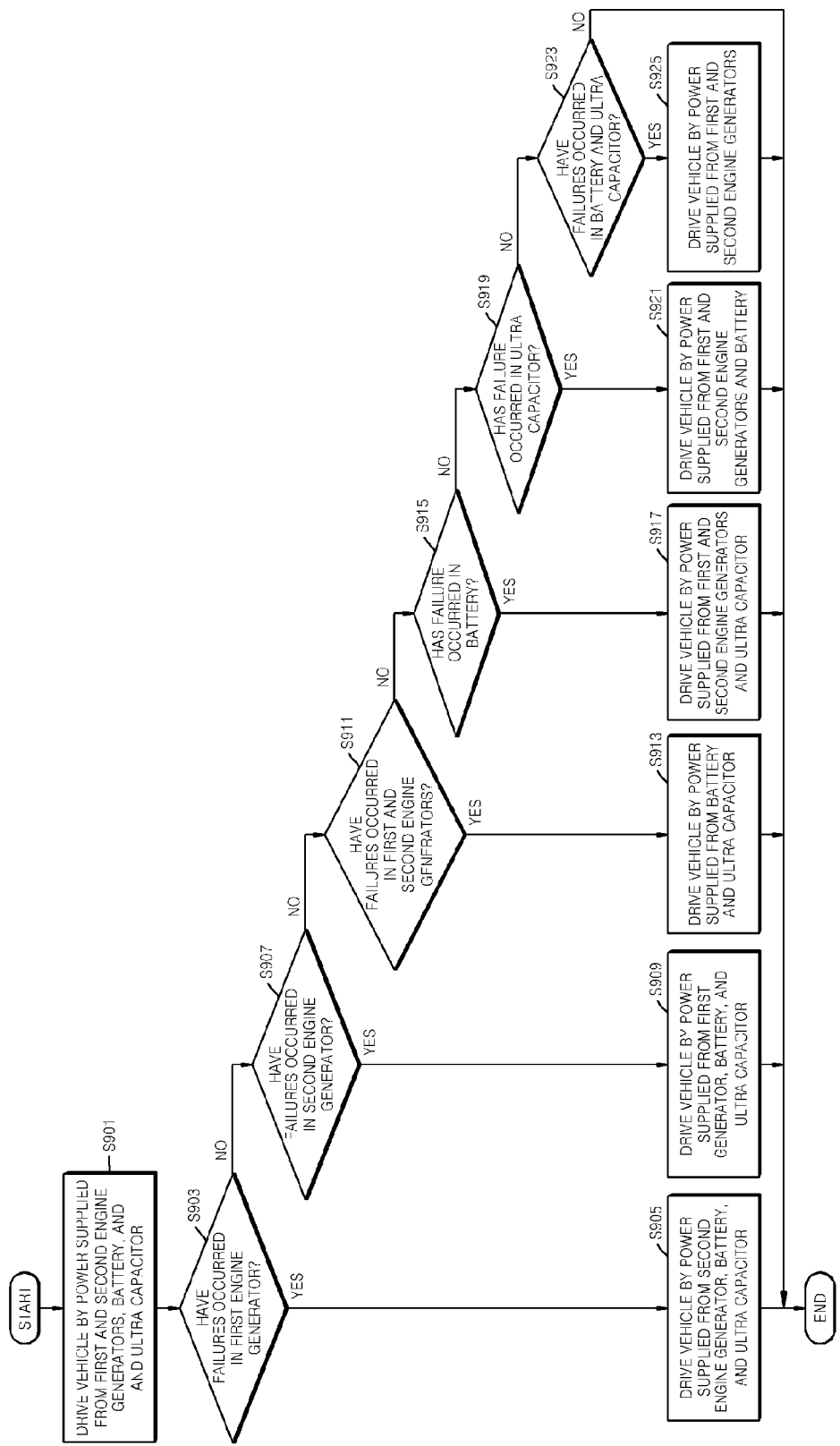

FIG. 9 is a flowchart illustrating a method of controlling travel of a vehicle according to an exemplary embodiment when all the first, second, third and fourth power supplies operate.

Referring to FIG. 9, the drive controller 600 performs an operation of driving the vehicle by power supplied from the first and second engine generators 100 and 200, the battery 300, and the ultra capacitor 400 (operation 901). Cases where the vehicle is driven by power supplied from the first and second engine generators 100 and 200, the battery 300, and the ultra capacitor 400 may include the general turn-in-place driving mode and the hill-climbing driving mode, but are not limited thereto.

During travel of the vehicle, the drive controller 600 performs an operation of determining whether a failure has occurred in the first engine generator 100 (operation 903). When a failure has occurred in the first engine generator 100, the drive controller 600 performs an operation of blocking a path connected to the first engine generator 100 and driving the vehicle by power supplied from the second engine generator 200, the battery 300, and the ultra capacitor 400 (operation 905).

During travel of the vehicle, the drive controller 600 performs an operation of determining whether a failure has occurred in the second engine generator 200 (operation 907). When a failure has occurred in the second engine generator 200, the drive controller 600 performs an operation of blocking a path connected to the second engine generator 200 and driving the vehicle by power supplied from the first engine generator 100, the battery 300, and the ultra capacitor 400 (operation 909).

During travel of the vehicle, the drive controller 600 performs an operation of determining whether failures have occurred in the first and second engine generators 100 and 200 (operation 911). When failures have occurred in the first and second engine generators 100 and 200, the drive controller 600 performs an operation of blocking the paths connected to the first and second engine generators 100 and 200 and driving the vehicle by power supplied from the battery 300 and the ultra capacitor 400 (operation 913).

During travel of the vehicle, the drive controller 600 performs an operation of determining whether a failure has occurred in the battery 300 (operation 915). When a failure has occurred in the battery 300, the drive controller 600 performs an operation of blocking a path connected to the battery 300 and driving the vehicle by power supplied from the first and second engine generators 100 and 200 and the ultra capacitor 400 (operation 917). Here, when the battery 300 is overcharged, the charged power may be consumed by a braking resistor.

During travel of the vehicle, the drive controller 600 performs an operation of determining whether a failure has occurred in the ultra capacitor 400 (operation 919). When a failure has occurred in the ultra capacitor 400, the drive controller 600 performs an operation of blocking a path connected to the ultra capacitor 400 and driving the vehicle by power supplied from the first and second engine generators 100 and 200 and the battery 300 (operation 921). Here, upon regenerative braking, regenerative power may be absorbed by the battery 300.

During travel of the vehicle, the drive controller 600 performs an operation of determining whether failures have occurred in the battery 300 and the ultra capacitor 400 (operation 923). When failures have occurred in the battery 300 and the ultra capacitor 400, the drive controller 600 performs an operation of blocking the paths connected to the battery 300 and the ultra capacitor 400 and driving the vehicle by power supplied from the first and second engine generators 100 and 200 (operation 925).

As described above, according to the one or more of the above exemplary embodiments of the present invention, it is possible to select various driving modes due to a combination of various power supply sources, and thus the corresponding vehicle may continue travel even in an emergency situation or a failure condition thereof.

Based on combinations of operation/stop of available power supplies, it is possible to provide various selectable driving modes using various combinations of power supply sources to a driver.

Based on the speed of a vehicle, it is possible to propose an efficient method for using power supply sources.

Based on the power state of a vehicle, it is possible to provide a stable driving mode.

Based on the speed of a vehicle and a user-selected driving mode, power supplies are operated/stopped so that an efficient and stable driving mode may be provided.

In the battery-centric driving mode, an engine generator exclusively responsible for charging of a battery may be used to maintain a fixed SOC.

Even if a failure occurs in at least one power supply during operation of a plurality of power supply sources, it is possible to replace the at least one power supply with another power supply, so that continuous driving may be ensured.

Furthermore, when a vehicle turns in place, it is possible to supplement an inadequate output by combining skid steering and Ackerman steering according to whether or not it is possible to use power supplies.

Meanwhile, other exemplary embodiments can also be implemented through computer readable code/instructions in/on a medium, e.g., a computer readable medium, to control at least one processing element to implement any above described exemplary embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments of the present invention. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of controlling a vehicle, the method comprising:
   determining a driving mode by determining a speed of the vehicle and receiving a user-selected driving mode, the user-selected driving mode including a plurality of user-selected driving modes and the speed of the vehicle being considered for each of the plurality of user-selected driving modes;
   determining at least one of a plurality of power supply sources to supply power to drive the vehicle based on the speed of the vehicle and one of the plurality of user-selected driving modes, each of the plurality of user-selected driving-modes using a different combination of the plurality of power supply sources to supply power to drive the vehicle, the plurality of power supply sources comprising:

a first engine generator and a second engine generator, each engine generator configured to generate power by using a turning force of an engine;

a battery charged by the first or second engine generator; and an ultra capacitor charged by the first or second engine generator; and determining an alternative driving mode comprising switching from at least a first power supply source of the plurality of power supply sources to at least a second power supply source of the plurality of power supply sources to drive the vehicle when a failure occurs in the first power supply source of the plurality of power supply sources.

2. A method of controlling a vehicle, the method comprising:

determining a driving mode by determining a speed of the vehicle and receiving a user-selected driving mode, the user-selected driving mode including a plurality of user-selected driving modes;

determining at least one of a plurality of power supply sources to supply power to drive the vehicle based on the speed of the vehicle and one of the plurality of user-selected driving modes, each of the plurality of user-selected driving-modes using a different combination of the plurality of power supply sources to supply power to drive the vehicle, the plurality of power supply sources comprising:

a first engine generator and a second engine generator, each engine generator configured to generate power by using a turning force of an engine;

a battery charged by the first or second engine generator; and an ultra capacitor charged by the first or second engine generator; and determining an alternative driving mode comprising switching from at least a first power supply source of the plurality of power supply sources to at least a second power supply source of the plurality of power supply sources to drive the vehicle when a failure occurs in the first power supply source of the plurality of power supply sources, wherein determining the driving mode comprises:

receiving a user selection of a low-noise driving mode at a first speed;

turning off the first and second engine generators; and driving the vehicle using power supplied from at least one of the battery and the ultra capacitor.

3. The method of claim 2, wherein the determining the driving mode further comprises:

reducing a maximum available power output and a highest speed of the vehicle; and driving the vehicle at the first speed in response to receiving an acceleration command for a speed greater than or equal to the first speed.

4. A method of controlling a vehicle, the method comprising:

determining a driving mode by determining a speed of the vehicle and receiving a user-selected driving mode, the user-selected driving mode including a plurality of user-selected driving modes;

determining at least one of a plurality of power supply sources to supply power to drive the vehicle based on the speed of the vehicle and one of the plurality of user-selected driving modes, each of the plurality of user-selected driving-modes using a different combination of the plurality of power supply sources to supply power to drive the vehicle, the plurality of power supply sources comprising:

a first engine generator and a second engine generator, each engine generator configured to generate power by using a turning force of an engine;

a battery charged by the first or second engine generator; and an ultra capacitor charged by the first or second engine generator; and determining an alternative driving mode comprising switching from at least a first power supply source of the plurality of power supply sources to at least a second power supply source of the plurality of power supply sources to drive the vehicle when a failure occurs in the first power supply source of the plurality of power supply sources, wherein determining the driving mode comprises:

receiving a user selection of a turn-in-place driving mode at a first speed;

supplying the power from the first and second engine generators, the battery, and the ultra capacitor; and driving the vehicle to turn in place by operating a first steering system configured to turn the vehicle using the supplied power and a skid caused by a difference in driving force between a left wheel and a right wheel.

5. The method of claim 4, wherein determining the alternative driving mode comprises:

when a failure occurs in the first engine generator and the second engine generator, operating a second steering system configured to turn the vehicle about a center of a turning circle; and driving the vehicle to turn in place by operation of the first steering system and a second steering system.

6. The method of claim 4, wherein determining the alternative driving mode comprises:

when a failure occurs in the battery, operating a second steering system configured to turn the vehicle about a center of a turning circle; and driving the vehicle to turn in place by operation of the first steering system and a second steering system.

7. The method of claim 2, wherein determining the driving mode further comprises:

receiving a user selection of a battery-centric driving mode at a second speed higher than the first speed and driving the vehicle using power supplied from the battery and one of the first engine generator and the second engine generator;

or receiving a user selection of an ultra-capacitor-centric driving mode at a second speed higher than the first speed and driving the vehicle using power supplied from the ultra capacitor and one of the first engine generator and the second engine generator.

8. The method of claim 7, wherein determining the alternative driving mode comprises:

when receiving a user selection of a battery-centric driving mode, checking a state of charge (SOC) of the battery and when the SOC of the battery is smaller than a reference value, charging the battery with power supplied from the other one of the first engine generator and the second engine generator; or when receiving a user selection of an ultra-capacitor-centric driving mode, checking a capacitance of the ultra capacitor, and when the capacitance of the ultra capacitor is smaller than a reference value, charging the ultra capacitor with power supplied from the other one of the first engine generator and the second engine generator.

9. The method of claim 7, wherein the determining the driving mode further comprises:

receiving a user selection of a battery-centric driving mode at a third speed higher than the second speed and driving the vehicle using the power supplied from the first engine generator, the second engine generator and the battery;

or receiving a user selection of an ultra-capacitor-centric driving mode at a third speed higher than the second speed and driving the vehicle using the power supplied from the first engine generator the second engine generator and the ultra capacitor.

10. The method of claim 9, wherein determining the alternative driving mode comprises:

when receiving a user selection of a battery-centric driving mode, checking a state of charge (SOC) of the battery and when the SOC of the battery is smaller than a reference value, controlling one of the first engine generator and the second engine generator to exclusively charge the battery, and continuously driving the vehicle by power supplied from one of the first engine generator and the second engine generator not controlled to exclusively charge the battery; or when receiving a user selection of an ultra-capacitor-centric driving mode, checking a capacitance of the ultra capacitor, and when the capacitance of the ultra capacitor is smaller than a reference value, controlling one of the first engine generator and the second engine generator to exclusively charge the ultra capacitor, and continuously driving the vehicle by power supplied from one of the first engine generator and the second engine generator not controlled to exclusively charge the ultra capacitor.

11. The method of claim 9, further comprising:

when receiving a user selection of a battery-centric driving mode, checking the SOC of the battery in response to a power used corresponding to an acceleration command input exceeding a driving output and when a value of the SOC of the battery is greater than or equal to the reference value, controlling one of the first engine generator and the second engine generator to stop charging the battery; or when receiving a user selection of an ultra-capacitor-centric driving mode, checking or the capacitance of the ultra capacitor in response to a power used corresponding to an acceleration command input exceeding a driving output and when the capacitance of the ultra capacitor is greater than or equal to the reference value, controlling one of the first engine generator and the second engine generator to stop charging the ultra capacitor and to supply power for the driving output.

12. The method of claim 9, further comprising when receiving a user selection of a battery-centric driving mode, checking the SOC of the battery or the capacitance of the ultra capacitor in response to a power used corresponding to an acceleration command input not exceeding a driving output; and when receiving a user selection of an ultra-capacitor-centric driving mode, when a value of the SOC of the battery or the capacitance of the ultra capacitor does not exceed a reference value, controlling one of the first engine generator and the second engine generator to exclusively charge the battery.

13. The method of claim 1, wherein the power is supplied from at least one of the first engine generator, the second engine generator, the battery, and the ultra capacitor.

14. The method of claim 13, wherein determining the alternative driving mode comprises:

determining that a failure occurs in the first engine generator; and driving the vehicle by switching to power supplied by the second engine generator, the battery, and the ultra capacitor.

15. The method of claim 13, wherein determining the alternative driving mode comprises:

determining that a failure occurs in the second engine generator; and driving the vehicle by switching to power supplied by the first engine generator, the battery, and the ultra capacitor.

16. The method of claim 13, wherein determining the alternative driving mode comprises:

determining that failures occur in the first engine generator and the second engine generator; and driving the vehicle by switching to power supplied by the battery and the ultra capacitor.

17. The method of claim 13, wherein the determining the alternative driving mode comprises:

determining that a failure occurs in the battery; and driving the vehicle by switching to power supplied by the first engine generator, the second engine generator and the ultra capacitor.

18. The method of claim 13, wherein determining the alternative driving mode comprises:

determining that a failure occurs in the ultra capacitor; and driving the vehicle by switching to power supplied by the first engine generator, the second engine generator and the battery.

19. The method of claim 13, wherein determining the alternative driving mode comprises:

determining that failures occur in the battery and the ultra capacitor; and driving the vehicle by switching to power supplied by the first engine generator and the second engine generator.

20. An apparatus for controlling a vehicle, the apparatus comprising:

a plurality of power supply sources comprising:

a first power supply comprising a first engine generator and a second power supply comprising a second engine generator, each of the first and second engine generators configured to generate power by using a turning force of an engine;

a third power supply comprising a battery charged by the first power supply or the second power supply;

a fourth power supply comprising an ultra capacitor charged by the first power supply or the second power supply; and a controller configured to:

determine a driving mode by determining a speed of the vehicle and receiving a user-selected driving mode, the user-selected driving mode including a plurality of user-selected driving modes and the speed of the vehicle is considered for each of the plurality of user-selected driving modes;

determine at least one of the plurality of power supply sources to supply power to drive the vehicle based on the speed of the vehicle and one of the plurality of user-selected driving modes, wherein each of the plurality of user-selected driving modes uses a different combination of the plurality of power supply sources to supply power to drive the vehicle; and determine an alternative driving mode comprising switching from the at least a first power supply source of the plurality of power supply sources to at least a second power supply source of the plurality of power supply sources to drive the vehicle when a failure occurs in the power supply source of the plurality of power supply sources.

\* \* \* \* \*